United States Patent
Shang et al.

(10) Patent No.: US 9,379,406 B2
(45) Date of Patent: Jun. 28, 2016

(54) METHOD FOR MAKING ANION ELECTROLYTE MEMBRANE

(71) Applicants: Tsinghua University, Beijing (CN); HONG FU JIN PRECISION INDUSTRY (ShenZhen) CO., LTD., Shenzhen (CN)

(72) Inventors: Yu-Ming Shang, Beijing (CN); Yao-Wu Wang, Beijing (CN); Shu-Bo Wang, Beijing (CN); Yong-Gang Liu, Beijing (CN); Jin-Hai Wang, Beijing (CN); Xiao-Feng Xie, Beijing (CN)

(73) Assignees: Tsinghua University, Beijing (CN); HONG FU JIN PRECISION INDUSTRY (ShenZhen) CO., LTD., Shenzhen (CN)

( * ) Notice: Subject to any disclaimer, the term of this patent is extended or adjusted under 35 U.S.C. 154(b) by 526 days.

(21) Appl. No.: 13/949,392

(22) Filed: Jul. 24, 2013

(65) Prior Publication Data

US 2014/0030613 A1 Jan. 30, 2014

(30) Foreign Application Priority Data

Jul. 27, 2012 (CN) .......................... 2012 1 02653569

(51) Int. Cl.
*H01M 8/10* (2006.01)
*C08J 5/20* (2006.01)
*C08J 5/22* (2006.01)
*B01J 41/00* (2006.01)
*B01D 71/52* (2006.01)
*B01D 67/00* (2006.01)
*B01D 69/14* (2006.01)
*B01D 71/62* (2006.01)
*B01D 71/82* (2006.01)

(52) U.S. Cl.
CPC ......... *H01M 8/1039* (2013.01); *B01D 67/0009* (2013.01); *B01D 69/148* (2013.01); *B01D 71/52* (2013.01); *B01D 71/62* (2013.01); *B01D 71/82* (2013.01); *B01J 41/00* (2013.01); *C08J 5/20* (2013.01); *C08J 5/225* (2013.01); *C08J 5/2206* (2013.01); *C08J 5/2262* (2013.01); *H01M 8/103* (2013.01); *H01M 8/1027* (2013.01); *H01M 8/1081* (2013.01); *B01D 2323/30* (2013.01); *C08J 2371/12* (2013.01); *Y02E 60/522* (2013.01); *Y02P 70/56* (2015.11)

(58) Field of Classification Search
CPC combination set(s) only.
See application file for complete search history.

(56) References Cited

U.S. PATENT DOCUMENTS

| | | | | |
|---|---|---|---|---|
| 5,235,044 A | * | 8/1993 | Mercer | C07D 27/107 534/550 |
| 6,201,051 B1 | * | 3/2001 | Mager | C08G 61/12 524/183 |
| 2002/0094466 A1 | * | 7/2002 | Kerres | B01D 67/0041 429/493 |
| 2004/0005474 A1 | * | 1/2004 | Charnock | B01D 67/0009 428/515 |
| 2006/0182942 A1 | * | 8/2006 | Valle | B01D 67/0079 428/304.4 |
| 2006/0194096 A1 | * | 8/2006 | Valle | B01D 67/0079 429/482 |
| 2008/0039554 A1 | * | 2/2008 | Liu | B01D 67/0079 523/310 |
| 2008/0134883 A1 | * | 6/2008 | Kumar | B01D 53/228 95/45 |
| 2009/0233146 A1 | * | 9/2009 | Lee | C08G 65/4006 429/493 |
| 2010/0197859 A1 | * | 8/2010 | Weber | B01D 67/0011 525/54.3 |
| 2012/0107725 A1 | * | 5/2012 | Akashi | C08J 5/2275 429/493 |
| 2012/0238648 A1 | * | 9/2012 | Zhou | B01J 49/00 521/27 |

FOREIGN PATENT DOCUMENTS

WO WO 2011/038198 * 3/2011 ............... B01J 49/00

OTHER PUBLICATIONS

Nagarale et al., "Preparation of polyvinyl-alcohol-silica hybrid heterogeneous anion-exchange membranes by sol-gel method and their characterization," J. Membrane Science 248 (2005) 37-44 (no month given).*
Hu et al., "Preparation and characterization of fluorinated poly(aryl ether oxadiazole)s anion exchange membranes based on imidazolium salts," International J. of Hydrogen Energy 37 (2012) 12659-12665—Available online Jun. 29, 2012.*
Wu et al., "PVA-silicon anion-exchange membranes prepared through a copolymer crosslinking agent," J. Membrane Science 250 (2010) 322-332—Available online Jan. 13, 2010.*

(Continued)

*Primary Examiner* — Ula C Ruddock
*Assistant Examiner* — Amanda Barrow
(74) *Attorney, Agent, or Firm* — ScienBiziP, P.C.

(57) ABSTRACT

In a method for making anion electrolyte membrane a fluorinated poly(aryl ether) ionomer is dissolved in a solvent to form a ionomer solution. A crosslink component is added to the ionomer solution, to achieve a transparent solution. An inorganic component precursor and water are introduced to the transparent solution, to form a sol-gel mixture. A crosslink catalyst is mixed with the sol-gel mixture to form a membrane casting solution. The membrane casting solution is coated on a substrate to form a membrane, and heated. The membrane is removed from the substrate.

11 Claims, No Drawings

(56) References Cited

OTHER PUBLICATIONS

Li et al., "A cross-linked fluorinated poly(aryl ether oxadiazole)s using a thermal cross-linking for anion exchange membranes," International Journal of Hydrogen Energy, 38 (2013) 11038-11044—Available online Jul. 12, 2013.*

Hamcicu et al, "Aromatic Polyethers Containing 1,3,4-oxadiazole rings" Revue Roumaine de Chimie, 2006, 51(1) 53-59 (no month given).*

Zhou et al., "Crosslinked, epoxy-based anion conductive membranes for alkaline membrane fuel cells," J. Membrane Science 350 (2010) 286-292—Available online Jan. 11, 2010.*

Gomes et al, "Fluorinated polyoxadiazole for high-temperature polymer electrolyte membrane fuel cell," J. of Membrane Sciences 321 (2008) 114-122—Available online Dec. 4, 2007.*

Shang et al., "Fluorene-containing sulfonated poly(arylene ether 1,3,4-oxadiazole) as proton-exchange membrane for PEM fuel cell application," J. Membrane Science 291 (2007) 140-147—AVailable online Jan. 18, 2007.*

* cited by examiner

METHOD FOR MAKING ANION ELECTROLYTE MEMBRANE

RELATED APPLICATIONS

This application claims all benefits accruing under 35 U.S.C. §119 from China Patent Application No. 201210265356.9, filed on Jul. 27, 2012 in the China Intellectual Property Office, the disclosure of which is incorporated herein by reference.

BACKGROUND

1. Technical Field

The present disclosure relates to a method for making anion electrolyte membranes.

2. Discussion of Related Art

Ion exchange membranes are key components for direct methanol fuel cell (DMFC), polymer electrolyte membrane fuel cell (PEMFC), and vanadium redox battery (VRB). The ion exchange membrane is a membrane having ion groups, selectively permeable for specific ions, and separating cathode electrode from anode electrode but transferring ions between the cathode electrode and the anode electrode. The ion exchange membranes should have high conductivity and selectivity for ions, high stability, and good mechanical strength. By having anion groups or cation groups, the ion exchange membrane can be an anion exchange membrane and a cation exchange membrane.

The most widely used ion exchange membranes are perfluorinated sulfonic acid membranes having sulfonic groups with negative charges.

In PEMFC and DMFC, the catalysts are nano-sized particles of platinum to endure the strong acidic circumstance caused by the perfluorinated sulfonic acid membranes. However, nano-sized platinum is expensive, which increases the costs of the fuel cells. By changing from acidic to alkaline, the cost of the fuel cells can be dramatically reduced because cheaper catalysts derived from non-noble metal such as rhodium, cobalt, nickel and silver can be used.

In VRB, the sulfonic groups of the perfluorinated sulfonic acid membranes can let proton transferred therethrough. However, the vanadium ion can also transfer through the membranes, which causes a cross pollution of the electrolyte and resulting the self-discharge of the batteries.

Further, the manufacture of the perfluorinated sulfonic acid membranes is complicated and costly.

What is needed, therefore, is to provide a method for making an anion electrolyte membrane.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

A method for making an anion electrolyte membrane is provided. The anion electrolyte membrane is a fluorinated poly(aryl ether) anion electrolyte membrane. The method includes steps of S1 to S6.

The step S1 is dissolving a fluorinated poly(aryl ether) ionomer in a solvent in a protective gas to form a ionomer solution with a mass concentration of about 5 wt % to about 20 wt %. The fluorinated poly(aryl ether) ionomer has a chemical structure represented by a formula (a):

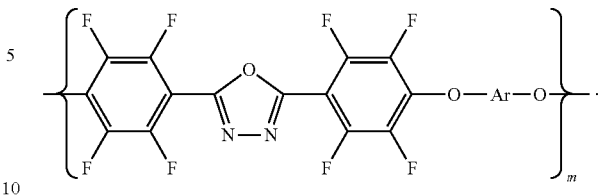

In the formula (a), Ar is a chemical group named TMPA or TMBA, represented by the following formulas:

TMPA:

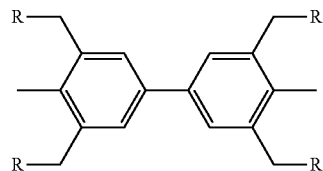

TMBA:

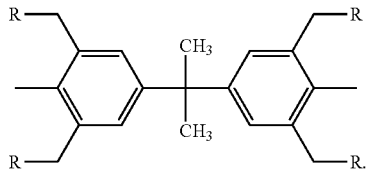

R is independently selected from hydrogen (H), and functional groups (I), (II), (III), (IV), and (V):

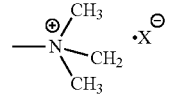

(I)

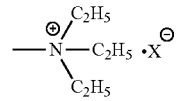

(II)

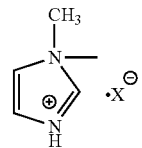

(III)

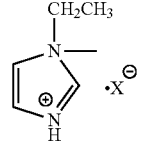

(IV)

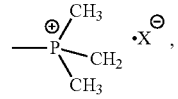

(V)

wherein X is at least one of $F^-$, $Cl^-$, $Br^-$, $I^-$, and $OH^-$.

The step S2 is adding a crosslink component to the ionomer solution to dissolve the crosslink component in the ionomer solution to achieve a transparent solution; a mass ratio of the crosslink component to the fluorinated poly(aryl ether) ionomer is about 1:100 to about 40:100.

The step S3 is introducing an inorganic component precursor and water to the transparent solution to form a sol-gel mixture. A mass ratio of the inorganic component precursor to the fluorinated poly(aryl ether) ionomer is about 3:100 to about 30:100, and a mass ratio of the water to the inorganic component precursor is about 0.1:100 to about 10:100.

The step S4 is mixing a crosslink catalyst with the sol-gel mixture at a temperature of about 0° C. to about 50° C. to form a casting solution. A mass ratio of the crosslink catalyst to the crosslink component is about 0.5:100 to about 10:100.

The step S5 is coating the casting solution on a substrate to form a membrane, and heating the membrane in a first temperature range of about 50° C. to about 80° C. for about 3 hours to about 24 hours, following by heating the membrane in a second temperature range of about 100° C. to about 150° C. for about 8 hours to about 24 hours.

The step S6 is removing the membrane from the substrate.

In step S1, the protective gas can be nitrogen ($N_2$) gas or argon (Ar) gas. In the fluorinated poly(aryl ether) ionomer, R can be the functional group or H. At least one R in the fluorinated poly(aryl ether) ionomer can be the functional group. The percentage of the amount of the functional groups to the total amount of R in the fluorinated poly(aryl ether) ionomer is named the functional degree. The functional degree of the fluorinated poly(aryl ether) ionomer is about 15%~95%. The number average molecular weight of the fluorinated poly(aryl ether) ionomer is about 5000 to about 200000. The solvent can be at least one of dimethylformamide, dimethylacetamide, 1,2-dichloroethane, acetonitrile, dimethyl sulfoxide, diphenylsulfone, sulfolane, and N-methylpyrrolidinone (NMP).

In step S2, the crosslink component can be at least one of poly(ethylene glycol), poly(vinyl alcohol), and hydroxyl terminated poly(dimethyl siloxane).

The number average molecular weight of the crosslink component is about 500 to about 300000.

In step S3, the inorganic component precursor and water are put into the transparent solution and stirred for about 1 hour to about 6 hours at a temperature of about 0° C. to about 80° C. The inorganic component precursor is at least one of tetraethyl orthosilicate (TEOS), tetrabutyl titanate, methyltriethoxysilane, trimethoxy(methyl)silane, and trimethoxypropylsilane, triethoxypropylsilane. The inorganic component precursor can have a reaction (e.g., hydrolysis reaction) with the water to form an inorganic component. The inorganic component precursor can be uniformly dispersed in the transparent solution. The formed inorganic component can also be uniformly dispersed in the sol-gel mixture.

In step S4, the sol-gel mixture can be cooled down to the temperature of about 0° C. to about 50° C., and the crosslink catalyst is put into the sol-gel mixture and stirred from about 0.5 hours to about 2 hours. The crosslink catalyst can be at least one of potassium hydroxide, sodium hydroxide, potassium carbonate, sodium carbonate, triethylamine, and tetramethylammonium hydroxide.

In the step S5, the two heating temperature ranges can remove the solvent, and have a crosslinking reaction in the membrane. Thus, after the two stages of heating, the interpenetrating polymer network in the membrane can be achieved.

In step S6, the membrane is peeled from the substrate and washed using deionized water to remove impurities in the membrane.

The achieved membrane is the fluorinated poly(aryl ether) anion electrolyte membrane with an interpenetrating polymer network.

More specific embodiments are described below.

Example 1

Under $N_2$ atmosphere, 100 g fluorinated poly(aryl ether) ionomer is dissolved in dimethylformamide to form a 5 wt % of ionomer solution. In the fluorinated poly(aryl ether) ionomer, Ar is TMPA, R is the functional group (II), X is Cl$^-$, and the functional degree is about 15%. The number average molecular weight of the fluorinated poly(aryl ether) ionomer is about 5000.

40 g poly(ethylene glycol) is slowly added into the ionomer solution, and the ionomer solution is stirred until the poly (ethylene glycol) is dissolved, to achieve the transparent solution. The number average molecular weight of the poly(ethylene glycol) is about 500.

3 g tetrabutyl titanate and 0.03 g water are orderly added into the transparent solution, and the transparent solution is stirred for about 1 hour at about 80° C., to form the sol-gel mixture.

The temperature of the sol-gel mixture is decreased to about 50° C., and 0.2 g KOH, which is the crosslink catalyst, is added to the sol-gel mixture, and the sol-gel mixture is stirred for about 0.5 hours, to achieve the membrane casting solution.

The membrane casting solution is coated on the substrate, and left to stand for about 3 hours at about 80° C., then left to stand for about 8 hours at about 150° C. The membrane is peeled from the substrate and washed with deionized water, to achieve the fluorinated poly(aryl ether) anion electrolyte membrane.

Example 2

In $N_2$ gas, 200 g fluorinated poly(aryl ether) ionomer is dissolved in dimethylacetamide to form a 15 wt % of ionomer solution. In the fluorinated poly(aryl ether) ionomer, Ar is TMBA, R is the functional group (I), X is Br$^-$, and the functional degree is about 95%. The number average molecular weight of the fluorinated poly(aryl ether) ionomer is about 200000.

2 g poly(vinyl alcohol) is slowly added to the ionomer solution, and the ionomer solution is stirred until the poly (vinyl alcohol) is dissolved, to achieve the transparent solution. The number average molecular weight of the poly(vinyl alcohol) is about 300000.

60 g tetraethyl orthosilicate and 3 g water are orderly added into the transparent solution, and the transparent solution is stirred for about 6 hour at about 0° C., to form the sol-gel mixture.

The temperature of the sol-gel mixture is decreased to about 0° C., and 0.2 g NaOH, which is the crosslink catalyst, is added into the sol-gel mixture, and the sol-gel mixture is stirred for about 2 hours, to achieve the membrane casting solution.

The membrane casting solution is coated on the substrate, and left to stand for about 24 hours at about 50° C., then left to stand for about 24 hours at about 100° C. The membrane is peeled from the substrate and washed using deionized water, to achieve the fluorinated poly(aryl ether) anion electrolyte membrane.

Example 3

In Ar gas, 100 g fluorinated poly(aryl ether) ionomer is dissolved in dimethyl sulfoxide to form a 10 wt % of ionomer solution. In the fluorinated poly(aryl ether) ionomer, Ar is TMBA, R is the functional group (IV), X is OH⁻, and the functional degree is about 50%. The number average molecular weight of the fluorinated poly(aryl ether) ionomer is about 100000.

20 g hydroxyl terminated poly(dimethyl siloxane) is slowly added into the ionomer solution, and the ionomer solution is stirred until the hydroxyl terminated poly(dimethyl siloxane) is dissolved, to achieve the transparent solution. The number average molecular weight of the hydroxyl terminated poly(dimethyl siloxane) is about 800.

20 g tetraethyl orthosilicate, 10 g triethoxypropylsilane, and 3 g water are orderly added to the transparent solution, and the transparent solution is stirred for about 4 hour at about 60° C., to form the sol-gel mixture.

The temperature of the sol-gel mixture is decreased to about 10° C., and 1 g $Na_2CO_3$, which is the crosslink catalyst, is added to the sol-gel mixture, and the sol-gel mixture is stirred for about 1.5 hours, to achieve the membrane casting solution.

The membrane casting solution is coated on the substrate, and left to stand for about 12 hours at about 60° C., then left to stand for about 16 hours at about 120° C. The membrane is peeled from the substrate and washed using deionized water, to achieve the fluorinated poly(aryl ether) anion electrolyte membrane.

Example 4

In $N_2$ gas, 150 g fluorinated poly(aryl ether) ionomer is dissolved in NMP to form a 8 wt % of ionomer solution. In the fluorinated poly(aryl ether) ionomer, Ar is TMPA, R is the functional group (III), X is I⁻, and the functional degree is about 80%. The number average molecular weight of the fluorinated poly(aryl ether) ionomer is about 150000.

15 g poly(ethylene glycol) and 30 g hydroxyl terminated poly(dimethyl siloxane) are slowly added to the ionomer solution, and the ionomer solution is stirred until the poly(ethylene glycol) and the hydroxyl terminated poly(dimethyl siloxane) are dissolved, to achieve the transparent solution. The number average molecular weight of the poly(ethylene glycol) is about 2000. The number average molecular weight of the hydroxyl terminated poly(dimethyl siloxane) is about 500.

20 g tetrabutyl titanate, 10 g trimethoxy(methyl)silane, and 0.03 g water are orderly added into the transparent solution, and the transparent solution is stirred for about 3 hours at about 20° C., to form the sol-gel mixture.

The temperature of the sol-gel mixture is decreased to about 5° C., and 0.5 g tetramethylammonium, which is the crosslink catalyst, is added into the sol-gel mixture, and the sol-gel mixture is stirred for about 1 hour, to achieve the membrane casting solution.

The membrane casting solution is coated on the substrate, and left to stand for about 8 hours at about 70° C., then left to stand for about 10 hours at about 150° C. The membrane is peeled from the substrate and washed using deionized water, to achieve the fluorinated poly(aryl ether) anion electrolyte membrane.

Example 5

In $N_2$ gas, 300 g fluorinated poly(aryl ether) ionomer is dissolved in dimethyl sulfoxide to form a 20 wt % of ionomer solution. In the fluorinated poly(aryl ether) ionomer, Ar is TMBA, R is the functional group (V), X is F, and the functional degree is about 88%. The number average molecular weight of the fluorinated poly(aryl ether) ionomer is about 50000.

24 g poly(vinyl alcohol) and 36 g hydroxyl terminated poly(dimethyl siloxane) are slowly added to the ionomer solution, and the ionomer solution is stirred until the poly(vinyl alcohol) and the hydroxyl terminated poly(dimethyl siloxane) are dissolved, to achieve the transparent solution. The number average molecular weight of the poly(vinyl alcohol) is about 5000. The number average molecular weight of the hydroxyl terminated poly(dimethyl siloxane) is about 100000.

6 g tetraethyl orthosilicate, 18 g trimethoxypropylsilane, and 0.36 g water are orderly added to the transparent solution, and the transparent solution is stirred for about 3 hours at about 70° C., to form the sol-gel mixture.

The temperature of the sol-gel mixture is decreased to about 20° C., and 1.8 g triethylamine, which is the crosslink catalyst, is added into the sol-gel mixture, and the sol-gel mixture is stirred for about 1 hour, to achieve the membrane casting solution.

The membrane casting solution is coated on the substrate, and left to stand for about 16 hours at about 50° C., then left to stand for about 20 hours at about 100° C. The membrane is peeled from the substrate and washed using deionized water, to achieve the fluorinated poly(aryl ether) anion electrolyte membrane.

Example 6

In $N_2$ gas, 500 g fluorinated poly(aryl ether) ionomer is dissolved in a mixture of sulfolane and dimethyl sulfoxide (1:1, v/v) to form a 15 wt % of ionomer solution. In the fluorinated poly(aryl ether) ionomer, Ar is TMPA, R is the functional group (III), X is Br⁻, and the functional degree is about 45%. The number average molecular weight of the fluorinated poly(aryl ether) ionomer is about 150000.

50 g poly(ethylene glycol) and 25 g poly(vinyl alcohol) are slowly added to the ionomer solution, and the ionomer solution is stirred until the poly(vinyl alcohol) and the poly(ethylene glycol) are dissolved, to achieve the transparent solution. The number average molecular weight of the poly(vinyl alcohol) is about 1000. The number average molecular weight of the poly(ethylene glycol) is about 20000.

25 g tetrabutyl titanate, 75 g methyltriethoxysilane, and 0.25 g water are orderly added into the transparent solution, and the transparent solution is stirred for about 5 hours at about 0° C., to form the sol-gel mixture.

The temperature of the sol-gel mixture is kept at about 0° C., and 1.5 g $K_2CO_3$, which is the crosslink catalyst, is added into the sol-gel mixture, and the sol-gel mixture is stirred for about 2 hour, to achieve the membrane casting solution.

The membrane casting solution is coated on the substrate, and left to stand for about 16 hours at about 60° C., then left to stand for about 24 hours at about 110° C. The membrane is peeled from the substrate and washed using deionized water, to achieve the fluorinated poly(aryl ether) anion electrolyte membrane.

The fluorinated poly(aryl ether) anion electrolyte membrane of the Examples 1 to 6 are tested, and the test results are shown in Table 1. The tests are processed at about 30° C.

TABLE 1

|  | Water uptake (wt %) | Swelling ratio (%) | Methanol permeability ($cm^2 \cdot s^{-1}$) | Ion conductivity ($S \cdot cm^{-1}$) | $VO^{2+}$ permeability ($cm^2/min$) |
|---|---|---|---|---|---|
| Example 1 | 15 | <1 | $1.3 \times 10^{-8}$ | $1.3 \times 10^{-2}$ | $1.6 \times 10^{-8}$ |
| Example 2 | 22 | <1 | $1.5 \times 10^{-7}$ | $4.1 \times 10^{-2}$ | $7.5 \times 10^{-8}$ |
| Example 3 | 19 | <1 | $5.3 \times 10^{-8}$ | $3.5 \times 10^{-2}$ | $4.5 \times 10^{-8}$ |
| Example 4 | 28 | <1 | $3.1 \times 10^{-8}$ | $3.9 \times 10^{-2}$ | $3.3 \times 10^{-8}$ |
| Example 5 | 26 | <1 | $2.2 \times 10^{-8}$ | $5.2 \times 10^{-2}$ | $1.1 \times 10^{-7}$ |
| Example 6 | 21 | <1 | $1.9 \times 10^{-7}$ | $4.3 \times 10^{-2}$ | $3.8 \times 10^{-8}$ |

The fluorinated poly(aryl ether) anion electrolyte membrane has an interpenetrating polymer network, and has good stability, mechanical property, and ionic conductivity, and a low $VO^{2+}$ permeability.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A method for making an anion electrolyte membrane, comprising:

dissolving a fluorinated poly(aryl ether) ionomer in a solvent in a protective gas, to form a ionomer solution having a mass concentration of about 5 wt % to about 20 wt %, wherein the fluorinated poly(aryl ether) ionomer has a chemical structure represented by a formula of

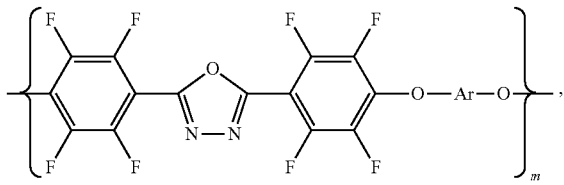

wherein Ar is a chemical group of

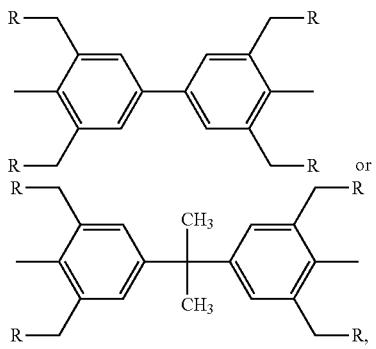

wherein R is independently selected from the group consisting of hydrogen, functional groups (I), (II), (III), (IV), and (V):

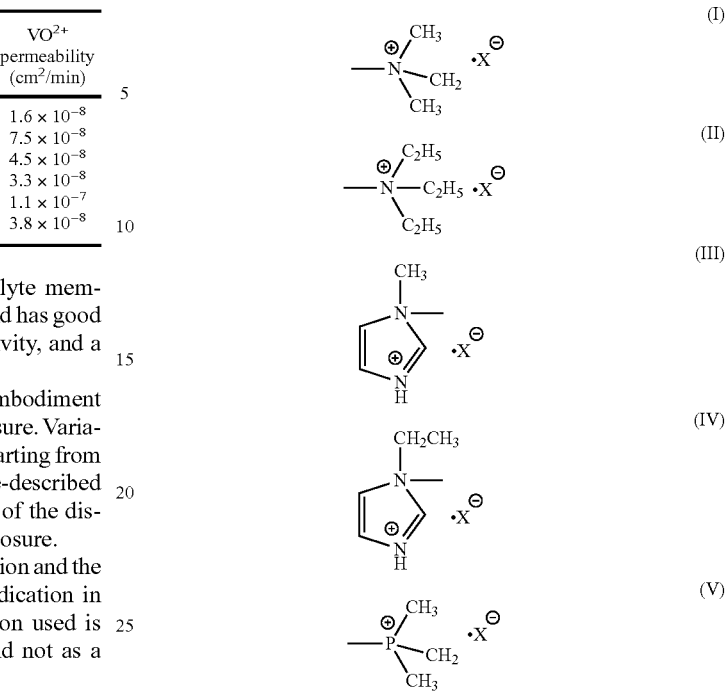

wherein X is at least one of $F^-$, $Cl^-$, $Br^-$, $I^-$, and $OH^-$;

adding a crosslink component to the ionomer solution to dissolve the crosslink component in the ionomer solution, to achieve a transparent solution, a mass ratio of the crosslink component to the fluorinated poly(aryl ether) ionomer being about 1:100 to about 40:100;

introducing an inorganic component precursor and water to the transparent solution, to form a sol-gel mixture, a mass ratio of the inorganic component precursor to the fluorinated poly(aryl ether) ionomer being about 3:100 to about 30:100, a mass ratio of the water to the inorganic component precursor being about 0.1:100 to about 10:100;

mixing a crosslink catalyst with the sol-gel mixture at a temperature of about 0° C. to about 50° C., to form a membrane casting solution, a mass ratio of the crosslink catalyst to the crosslink component being about 0.5:100 to about 10:100;

coating the membrane casting solution on a substrate to form a membrane, and heating the membrane in a first temperature range of about 50° C. to about 80° C. for about 3 hours to about 24 hours, following by heating the membrane in a second temperature range of about 100° C. to about 150° C. for about 8 hours to about 24 hours; and removing the membrane from the substrate.

2. The method of claim 1, wherein the protective gas is at least one of nitrogen gas or argon gas.

3. The method of claim 1, wherein a functional degree of the fluorinated poly(aryl ether) ionomer is about 15%~95%.

4. The method of claim 1, wherein a number average molecular weight of the fluorinated poly(aryl ether) ionomer is about 5000 to about 200000.

5. The method of claim 1, wherein the solvent is selected from the group consisting of dimethylformamide, dimethylacetamide, 1,2-dichloroethane, acetonitrile, dimethyl sulfoxide, diphenylsulfone, sulfolane, and N-methylpyrrolidinone.

6. The method of claim 1, wherein the crosslink component is selected from the group consisting of poly(ethylene glycol), poly(vinyl alcohol), and hydroxyl terminated poly(dimethyl siloxane).

7. The method of claim 1, wherein a number average molecular weight of the crosslink component is about 500 to about 300000.

8. The method of claim 1, wherein the inorganic component precursor and the water are introduced into the transparent solution and stirred for about 1 hours to about 6 hours at a temperature of about 0° C. to about 80° C.

9. The method of claim 1, wherein the inorganic component precursor is selected from the group consisting of tetraethyl orthosilicate, tetrabutyl titanate, methyltriethoxysilane, trimethoxy(methyl)silane, and trimethoxypropylsilane, triethoxypropylsilane.

10. The method of claim 1, wherein the crosslink catalyst is selected from the group consisting of potassium hydroxide, sodium hydroxide, potassium carbonate, sodium carbonate, triethylamine, and tetramethylammonium hydroxide.

11. The method of claim 1, wherein the crosslink catalyst is put into the sol-gel mixture and stirred from about 0.5 hours to about 2 hours.

\* \* \* \* \*